June 12, 1928.  
E. DAVIS  
1,673,317  
PRESSURE ADJUSTING AND INDICATING MEANS FOR PRESSING MACHINES  
Filed June 23, 1927  2 Sheets-Sheet 1

INVENTOR.  
Ernest Davis  
BY  
Parsons & Bodell  
ATTORNEYS.

June 12, 1928.  
E. DAVIS  
1,673,317  
PRESSURE ADJUSTING AND INDICATING MEANS FOR PRESSING MACHINES  
Filed June 23, 1927  2 Sheets-Sheet 2
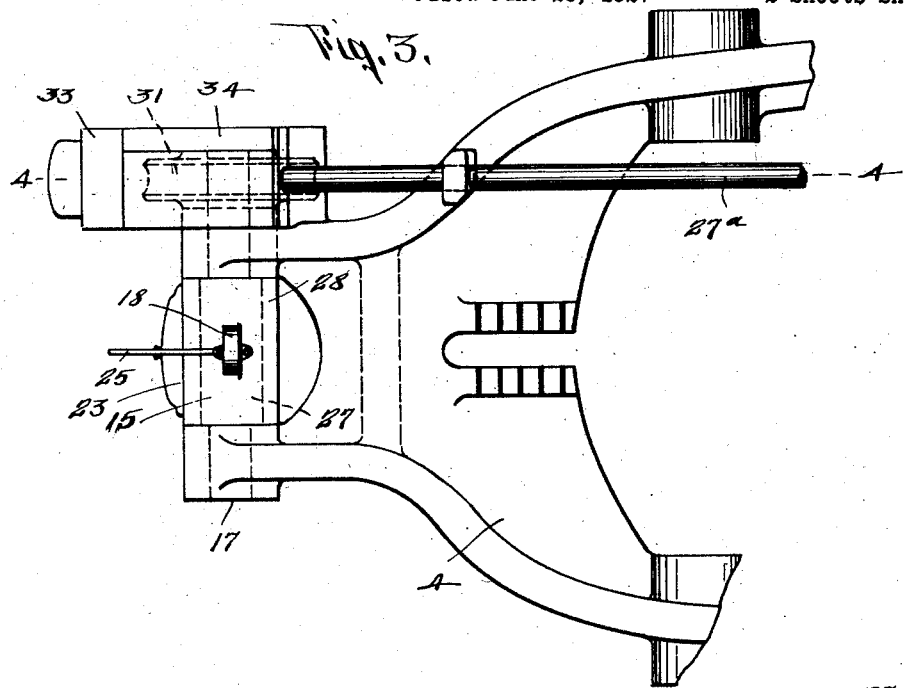
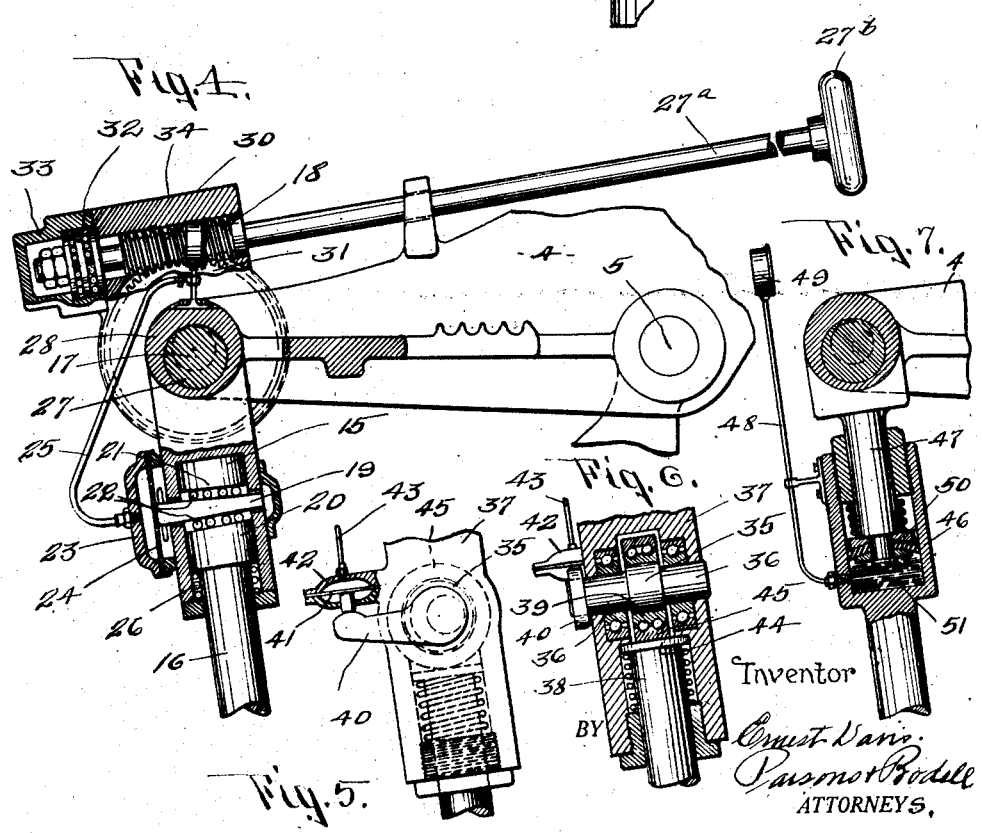

Patented June 12, 1928.

1,673,317

UNITED STATES PATENT OFFICE.

ERNEST DAVIS, OF SYRACUSE, NEW YORK, ASSIGNOR TO THE PROSPERITY COMPANY INC., OF SYRACUSE, NEW YORK, A CORPORATION OF NEW YORK.

PRESSURE ADJUSTING AND INDICATING MEANS FOR PRESSING MACHINES.

Application filed June 23, 1927. Serial No. 200,983.

This invention relates to presses such as garment and laundry presses and has for its object a simple and efficient means for adjusting and indicating the pressure to aid the operator in adjusting the pressure.

The invention consists in the novel features and in the combinations and constructions hereinafter set forth and claimed.

In describing this invention reference is had to the accompanying drawings in which like characters designate corresponding parts in all the views.

Figure 3 is an enlarged plan view similar to Figure 2.

Figure 4 is a sectional view of the line 4—4 Figure 3.

Figures 5 and 6 are fragmentary views of another form of the pressure indicating means embodying my invention.

Figure 7 is a fragmentary view of a third form of pressure indicating means embodying my invention.

Figure 2:
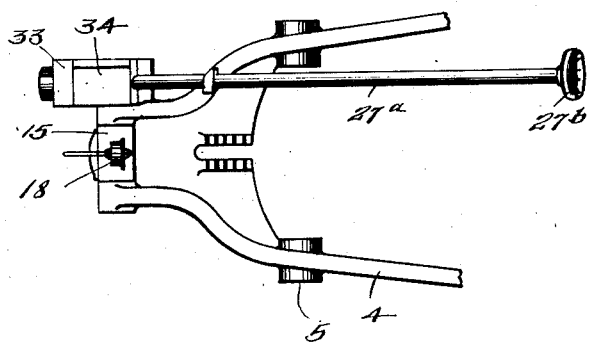
Figure 2 is a fragmentary plan view of parts seen in Figure 1.
Figure 1:
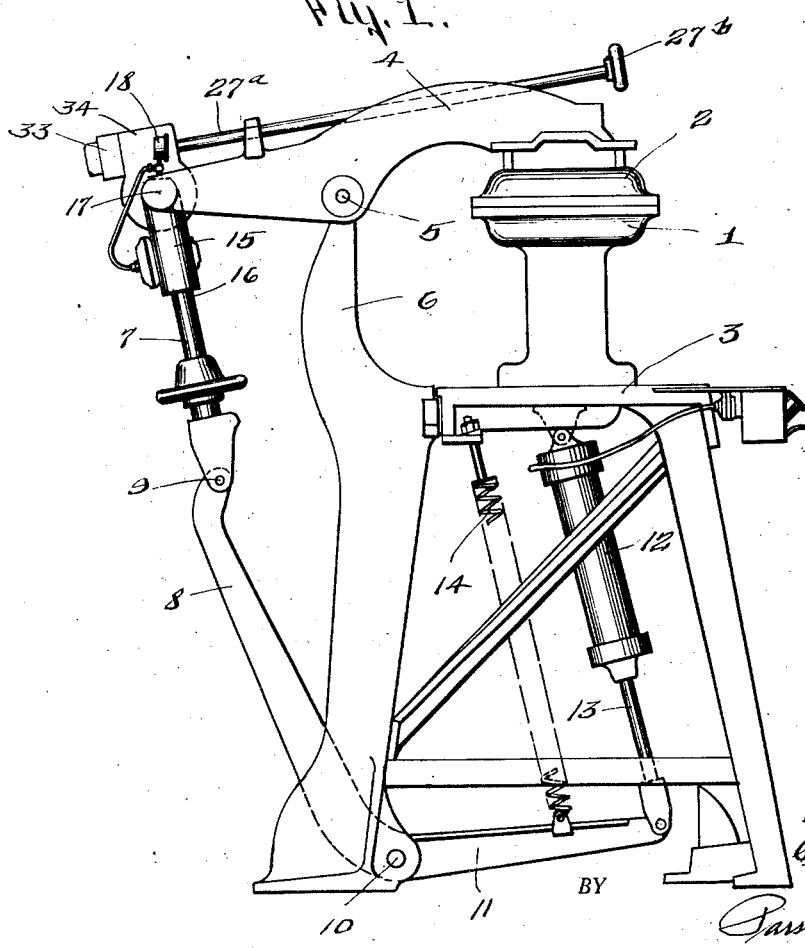
Figure 1 is a side elevation of the machine embodied in my invention.

In garment and laundry pressing machines the effective pressing depends upon pressure, heat, the condition of the garment when being pressed and the padding used on the lower pressing element or buck. Various means have been used to adjust the pressure but the amount of the adjustment has been guesswork as the pressure is constantly varying and it cannot be determined whether the ineffective pressing is due to the lack of pressure, lack of heat, or the condition of the pad. The condition of the goods when brought to the pressing machine, that is whether they are too wet or too dry, can be ascertained by inspection and this condition remedied. The condition as to temperature can be determined by the thermometer on the pressure head to indicate the temperature of the pressure face of the heat, and by my invention the amount of pressure can be determined by the gauge and the pressure accurately adjusted. If correction as to pressure, temperature and the condition of the goods do not remedy defects in pressing, it is known that the trouble is in the pad. Heretofore remedying the condition as to pressure has been a matter of guesswork. The conditions are constantly varying as a machine that operates satisfactorily at the start may within half an hour not be working satisfactorily. By my invention the operator can readily and accurately adjust the pressure and then if the work is not pressed satisfactorily can by elimination locate where the defect is in the machine. The application of the thermometer to the head to indicate the temperature forms no part of this invention.

The pressing machine may be of any suitable form, size and construction, that here shown including a lower pressing element or buck 1, a head 2 movable toward and from the buck, the buck being mounted on a suitable frame 3 and the head being carried at the forward end of a yoke or lever 4, pivoted between its ends at 5 to a standard 6 raising from the frame. The head is actuated by suitable mechanism including the lever 4. The mechanism as here shown further includes members 7 and 8 pivoted together at 9, the member 7 being pivoted as hereinafter described directly to the rear arm of the lever 4 and the member 8 being pivoted at 10 to the frame near the lower end thereof and having a forwardly extending arm 11 by which it is actuated. The arm 11 is in this form of pressing machines shown as actuated by power or by motor here illustrated as consisting of a cylinder 12 having a piston movable therein which is connected by a rod 13 to the arm 11. The motor is a single acting one and the flow of motive fluid as air, to and from the motor is controlled in any suitable manner. The action of the piston in the cylinder closes the head 2 down on the buck 1, and the press is opened when the air is released from the cylinder by a counter spring 14. The construction thus far described forms no part of this invention.

The members 7 and 8 are in effect toggle links. The member 7 is composed of the two parts 15 and 16 which thrust toward each other and one telescopes into the other and the part 15 is pivoted at 17 to the rear arm of the lever 4 while the part 16 is pivoted at 9 to the member 8.

The pressure indicating means includes a pressure operated gauge 18 of any suitable construction and this gauge is operated to indicate the pressure through mechanism interposed between the members 15 and 16 for transferring the movement from one member to the other and transferring the pressure to the gauge. The gauge may not indicate the pressure in pounds, but the dial may contain graduations indicating full pressure, one-half pressure, etc., or any mark by which the operator can tell whether or not the pressure is up to the required point. In the construction shown in Figures 4, 5 and 6, this pressure transferring means acts upon the inclined plane principle, that shown in Figure 4 being a wedge member 19 interposed between the parts 15 and 16 and movable laterally by the pressure between said parts, the amount of movement being dependent upon the amount of pressure. As seen in Figure 4 the part 16 telescopes into the part 15 and has a head 20 slidably fitting the cylindrical chamber in the member 15 and the wedge 19 is interposed between the head and the opposing surface 21 in the member 15. Rollers 22 are interposed between the wedge and the opposing surfaces of the head 20 and part 15. The lateral movement of the wedge is transferred to the gauge through a pressure chamber 23 having a diaphragm 24 therein and a pipe 25 connecting the diaphragm chamber and the gauge, the wedge acting on one side of the diaphragm. The pipe 25 connects the other side of the diaphragm chamber and the gauge. Preferably the pipe and diaphragm are filled with a hydraulic fluid as oil. Obviously during the thrusting movement of the part 15 toward the part 16 the wedge 15 will in accordance with the pressure, be shifted laterally more or less and a pressure dependent upon the amount of lateral movement, be indicated on the gauge 18. This gauge is of any suitable form, size and construction and as the construction of the pressure gauge is well known, description thereof is unnecessary.

A comparatively light spring 26 acts on the head 20 to hold the head against the wedge; that is the spring acts to take up the looseness between these parts 15, 16 and the wedge, before the pressure is applied.

The means for adjusting the pressure, as here shown comprises means for adjusting the toggle links 7 and 8 endwise to, in effect, practically lengthen or shorten them. This means may be located at any of the bearings 17, 9 or 10 to raise and lower it, but is preferably located at the pivot 17 where it can be more conveniently operated. This pressure adjusting means includes a cam or eccentric 27 on the pivot and working in a complemental strap or bearing 28 in the upper end of the part 15 and the pivot 17 is shifted to vary the eccentricity thereof by manual means. This manual means comprises a shaft 27ᵃ carried by the yoke or lever 4 and having a handle 27ᵇ at its front end and connected at its rear end to the pivot 17 through a worm 30 on the shaft and meshing with a worm gear 31 on the pivot 17. The shaft has a bearing 32 at its rear end in a housing 33 carried by the yoke lever and also this housing has a section 34 inclosing the worm. The gauge 18 is also preferably mounted on the upper end of the part 15 to partake of the movements thereof, thus avoiding flexible connections between the diaphragm chamber and the gauge.

Obviously by turning the handle 27ᵇ and varying the amount of eccentricity of the cam 27, the amount of pressure delivered will be varied.

In Figures 5 and 6, the wedge instead of being movable laterally, operates on the inclined plane principle in a rotary direction. In Figures 5 and 6, the wedge is an eccentric 35 having trunnions 36 journalled in bearings in a part 37 which corresponds to the part 15 and the thrusting part 38 which corresponds to the part 16 acts on a strap 39 around the eccentric. This eccentric has a lever arm 40 which acts on a diaphragm 41 located in a chamber 42 connected by a pipe 43 to the gauge. The part 38 has a head 44 which acts on the strap 39 or the bearing 45 for said strap. The strap is mounted in an anti-friction bearing carried by the head 44 and the trunnions 36 mounted in anti-friction bearings mounted in the member 37. The operation of the eccentric 35 is on the inclined plane principle but in a rotary direction. In Figure 7, the means for transferring the thrust of one of the thrust parts to the other is a hydraulic chamber having a hydraulic fluid, as oil, therein and the pressure of the oil is indicated on the gauge. In Figure 7, the part 46 which corresponds to the part 16 is formed with a cylinder and the part 47 which corresponds to the part 15 has a piston 50 movable in the cylinder against a body of oil 51 therein and the chamber of the cylinder is connected by a pipe 48 to the gauge. In all the forms shown in Figures 5, 6 and 7, the pressure is adjusted by any suitable means similar to that shown in Figure 4. In any construction, owing to the hydraulic means, the pressure can be accurately determined or furthermore, can be quickly and accurately adjusted.

What I claim is:

1. A pressing machine comprising cooperating pressing elements one of which is movable toward and from the other, means for actuating the movable element including motion transmitting parts one of which thrusts toward the other to apply pressure to the movable element, pressure indicating mechanism including a gauge, means interposed between said parts for transferring the thrusting movement from one part to the other, connections between said means and the gauge to transfer the movement of said interposed means under the pressure of said parts to the gauge, and a pressure chamber connected to the gauge.

2. A pressing machine comprising cooperating pressing elements one of which is movable toward and from the other, means for actuating the movable element including motion transmitting parts one of which thrusts toward the other to apply pressure to the movable element, pressure indicating mechanism including a gauge, a pressure chamber for a hydraulic fluid arranged to be acted on by the pressure between the said parts and a pipe connecting said chamber and the gauge.

3. A pressing machine comprising cooperating pressing elements one of which is movable toward and from the other, means for actuating the movable element including motion transmitting parts one of which thrusts toward the other to apply pressure to the movable element, pressure indicating mechanism including a gauge, a shiftable wedge member interposed between said parts for transferring the thrusting movement from one member to the other, connections between said wedge member and the gauge to transfer the movement of wedge member under the pressure of said parts to the gauge.

4. A pressing machine comprising cooperating pressing elements one of which is movable toward and from the other, means for actuating the movable element including motion transmitting parts one of which thrusts toward the other to apply pressure to the movable element, pressure indicating mechanism including a gauge, a laterally movable shiftable wedge member between said parts for transferring the thrusting movement from one part to the other, connections between said wedge and the gauge to transfer the movement of said wedge under the compression of said parts to the gauge.

5. A pressing machine comprising cooperating pressing elements one of which is movable toward and from the other, means for actuating the movable element including motion transmitting parts one of which thrusts toward the other, pressure indicating mechanism including a gauge and means interposed between said member for transferring the thrusting movement from one part to the other and connections between said interposed means and the gauge to transfer the pressure to the gauge, and means for adjusting the pressure between the actuating means.

6. A pressing machine comprising cooperating pressing elements one of which is movable toward and from the other, means for actuating the movable element including motion transmitting parts one of which thrusts toward the other to apply pressure to the movable element, pressure indicating mechanism including a gauge, means interposed between said parts for transferring the thrusting movement from one member to the other, connections between said means and the gauge to transfer the movement of said means under the pressure of said parts to the gauge, and a pressure chamber connected to the gauge, and means for adjusting the pressure of the actuating means.

7. A pressing machine comprising cooperating pressing elements one of which is movable toward and from the other, means for actuating elements including motion transmitting parts one of which thrusts toward the other to apply pressure to the movable element, pressure indicating means including a gauge, a pressure chamber for hydraulic fluid arranged to be acted on by the pressure between the said parts and a pipe connecting said chamber and the gauge, and means for adjusting the pressure between the actuating means.

8. A pressing machine comprising cooperating pressing elements one of which is movable toward and from the other, means for actuating the movable element including motion transmitting parts one thrusting toward the other, indicating means including a gauge and pressure operated means interposed between said parts, and means for transferring the pressure of the pressure operated means to the gauge.

9. A pressing machine comprising cooperating pressing elements one of which is movable toward and from the other, means for actuating the movable element including motion transmitting parts one thrusting against the other, indicating means including a gauge and pressure operated means interposed between said parts, means for transferring the pressure of the pressure operated means to the gauge, one of said parts being pivoted and manually operated means for shifting the pivotal joint in a direction lengthwise of said thrusting parts and holding it in its adjusted position.

10. A pressing machine comprising cooperating pressing elements one of which is movable toward and from the other, means for actuating the movable element including motion transmitting parts one thrusting against the other, indicating means including a gauge and pressure operative means interposed between said parts, means for transferring the pressure of the pressure operated means to the gauge, one of said parts being pivoted and the pivot having an eccentric thereon, coacting with the bearing therefor, on said part and means for turning the pivot for adjusting the eccentricity thereof.

In testimony whereof, I have hereunto signed my name at Syracuse, in the county of Onondaga, in the State of New York this 14th day of June, 1927.

ERNEST DAVIS.